(12) United States Patent
Tsai

(10) Patent No.: US 8,936,845 B2
(45) Date of Patent: Jan. 20, 2015

(54) MULTIPLY THIN PAPER SHEET HAVING PRESS-TO-BOND STRUCTURE

(75) Inventor: Tung-I Tsai, Taoyuan (TW)

(73) Assignee: Chan Li Machinery Co., Ltd., Taoyuan (TW)

( * ) Notice: Subject to any disclaimer, the term of this patent is extended or adjusted under 35 U.S.C. 154(b) by 1060 days.

(21) Appl. No.: 12/461,214

(22) Filed: Aug. 5, 2009

(65) Prior Publication Data

US 2010/0233440 A1   Sep. 16, 2010

(30) Foreign Application Priority Data

Mar. 13, 2009   (TW) ................................ 98108171 A

(51) Int. Cl.
   *B32B 3/00*      (2006.01)
   *D21H 27/40*     (2006.01)
   *B32B 29/06*     (2006.01)
   *D21H 27/30*     (2006.01)

(52) U.S. Cl.
   CPC ................ *B32B 29/06* (2013.01); *D21H 27/30* (2013.01)
   USPC ........... 428/166; 428/154; 428/172; 428/174; 162/109

(58) Field of Classification Search
   CPC ............ B32B 3/26; B32B 3/30; B32B 29/00; B32B 29/06; B32B 2555/02; D21H 27/002; D21H 27/40; A47K 10/00
   USPC .......... 428/156, 166, 172, 154, 174; 162/109, 162/113
   See application file for complete search history.

(56) References Cited

U.S. PATENT DOCUMENTS

| | | | | |
|---|---|---|---|---|
| 3,708,366 A * | 1/1973 | Donnelly | ....................... | 156/209 |
| 5,269,983 A * | 12/1993 | Schulz | ........................ | 264/400 |
| 6,277,466 B1 * | 8/2001 | McNeil et al. | ................ | 428/154 |
| 6,579,594 B2 * | 6/2003 | Wendler, Jr. | ................. | 428/172 |
| 6,733,866 B2 * | 5/2004 | Muller | ......................... | 428/172 |
| 2002/0160155 A1 * | 10/2002 | Muller | ......................... | 428/172 |

* cited by examiner

Primary Examiner — Donald J Loney
(74) Attorney, Agent, or Firm — Rosenberg, Klein & Lee

(57) ABSTRACT

A multiply thin paper sheet having a press-to-bond structure is disclosed, including a first thin paper layer having a first stacking surface and at least one second thin paper layer having a second stacking surface. The first and second stacking surfaces are partially overlapped with each other to define a stacking zone provided between the first thin paper layer and the second thin paper layer. After the stacking zone is subjected to a rolling operation by a rolling pressure, a plurality of first pressed sections are formed on the first thin paper layer, having a predetermined height extended according to a given direction, and a plurality of second pressed sections are formed on the second thin paper layer according to the given direction and respectively corresponding to the first pressed sections of the first thin paper layer. At least one portion of each first pressed section and the respective corresponding second pressed section are bonded and formed as a pressed and bonded site, such that the first thin paper layer and second thin paper layer can be pressed, bonded and patterned simultaneously.

10 Claims, 6 Drawing Sheets

MULTIPLY THIN PAPER SHEET HAVING PRESS-TO-BOND STRUCTURE

FIELD OF THE INVENTION

The present invention relates to a thin multiply paper sheet, and in particular to a multiply thin paper sheet having a press-to-bond structure.

BACKGROUND OF THE INVENTION

Hygiene paper products, such as paper handkerchiefs, facial tissues, kitchen towels, withdrawable tissue papers, or rolled tissue papers, are paper products that are used for wiping or cleaning. For the needs of the current industry, the hygiene paper products have been widely used in various applications.

Generally speaking, the hygiene paper product is made by stacking at least one single sheet of paper as a basic unit to improve the toughness of the paper product and provide the general consumers with better stability in using the paper product. Thus, to meet the current needs, the manufacturers often bond two plies or multiple plies of paper together with various processes in making the hygiene paper products, in order to prevent the stacked paper plies from separation.

An example is shown in Taiwan Patent No. M274239, which discloses a multiply paper structure that has improved adhesion, comprising at least two plies of paper, among which an upper ply has an inside surface forming at least one pattern frame. Glue is applied along a circumference of the pattern frame to manifest the patter frame and to adhesively bond to an inside surface of a lower ply in order to prevent separation of the plies when the multiply paper is withdrawn or used.

However, the currently available hygiene paper products, including paper handkerchiefs, facial tissues, kitchen towels, withdrawable tissue papers, or rolled tissue papers, are made by bonding two or more plies of paper together, and the patterns formed thereon are monotonous and boring. The purpose is often emphasized to bond the paper plies together. Glues are used in various paper products to bond two or more paper plies together. Yet, application of glues should be eliminated to the most extent possible for the protection of the environment.

SUMMARY OF THE INVENTION

The hygiene paper products that are currently available in the market have been improved by the manufacturers in various respects. However, the problems associated with gluing two or more paper plies together have not yet been solved by most of the paper product manufacturers. Using glue to bond paper plies not only increases the costs, but also causes environmental protection problems.

Thus, an objective of the present invention is to provide a multiply thin paper sheet having a press-to-bond structure, wherein two or more paper plies are bonded together without using glues or adhesives.

The technical solution that the present invention adopts to solve the above discussed problems is to provide a concave-pattern presser roller on which at least one concave-pattern pressing spot is formed and a convex-pattern presser roller on which at least one convex-pattern pressing spot is formed. A first thin paper layer and a second thin paper layer are simultaneously transmitted through between the presser rollers, subjected to rolling for forming a multiply thin paper sheet. The first thin paper layer has a first stacking surface. The second thin paper layer has a second stacking surface. The first and second stacking surfaces partially overlap each other to define a stacking zone provided between the first thin paper layer and the second thin paper layer. After the stacking zone is subjected to rolling operation by a rolling pressure, a plurality of first pressed sections are formed on the first thin paper layer, having a predetermined height extended according to a given direction, and a plurality of second pressed sections are formed on the second thin paper layer according to the given direction and respectively corresponding to the first pressed sections. At least one portion of each first pressed section and the corresponding second pressed section are bonded together to form a pressed and bonded site that is used to bond the first thin paper layer and the second thin paper layer together, and also forms patterns by the rolling accordingly.

With the technical solution adopted in the present invention, the hygiene paper products, such as paper handkerchiefs, facial tissues, kitchen towels, withdrawable tissue papers, or rolled tissue papers, manufactured in accordance with the present invention have two or multiple plies of thin paper layers firmly bonded together within a press-to-bond zone by the rolling operation, effectively preventing the paper layers from separation from each other thereby enhancing product stability in use by the general consumers. Further, in the patterned zone, raised dots of various shapes and heights provided on a convex-pattern presser roller and recessed dots provided on a concave-pattern presser roller cooperate with each other to form figures or texts of three-dimensional configurations on the thin paper sheet to enhance a feeling of freshness and thus attracting the attempt of purchasing of the general consumers and extending the economic values. The present invention uses no glue or adhesive and directly bonds two or multiple plies of paper together through rolling. This reduces the manufacturing costs and is also effective in protecting the environment. Further, the pattern pressing spots of each layer of the two-ply or multiply thin paper sheet within the patterned zone can be designed to not bond to each other through properly configured raised/recessed dots on the presser rollers so as to provide spacing between the paper plies and thus offering a cushioning effect. When a user holds the hygiene paper products, such as paper handkerchiefs, facial tissues, kitchen towels, withdrawable tissue papers, or rolled tissue papers, with his or her hands, a feeling of resilience and comfortableness is provided. In other words, the present invention provides a two-ply or multiply thin paper sheet that offers the advantages of bonding by only being subjected to pressing, forming patterns, and generating a three-dimensional pattern.

BRIEF DESCRIPTION OF THE DRAWINGS

The present invention will be apparent to those skilled in the art by reading the following description of preferred embodiments thereof with reference to the drawings, in which.

DETAILED DESCRIPTION OF THE PREFERRED EMBODIMENTS

Figure 1:
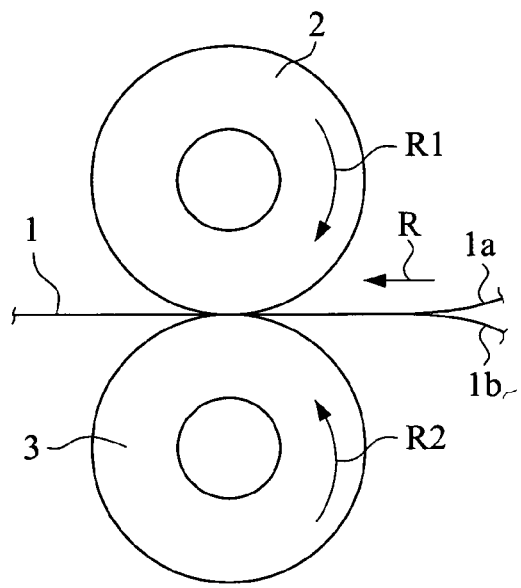
FIG. 1 is a schematic side elevational view of presser rollers in accordance with the present invention.

With reference to the drawings and in particular to FIG. 1, which shows a schematic side elevational view of presser rollers in accordance with the present invention, a two-ply or multiply thin paper web or sheet 1 comprises a first thin layer of paper 1*a* and at least one second thin layer of paper 1*b*. When the first thin paper layer 1*a* and one second thin paper layer 1*b* are fed in a feeding path R and are subjected to rolling and pressing by a concave-pattern presser roller 2 that rotates in a first rotation directional R1 and a convex-pattern presser roller 3 that rotates in a second rotational direction R2 to form patterns on surfaces of the multiply thin paper sheet 1 and to have the first thin paper layer 1*a* and the second thin paper layer 1*b* bonded together.

Figure 2:
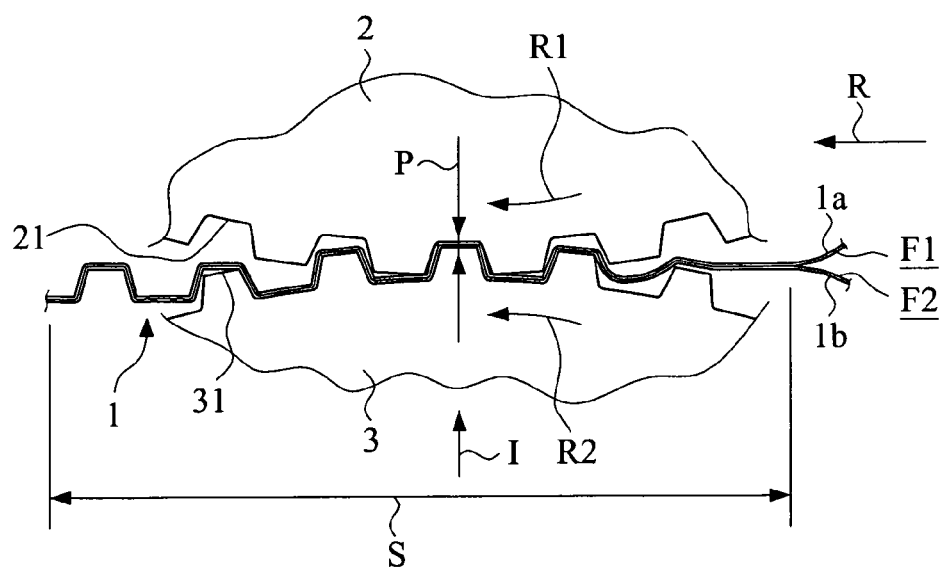
FIG. 2 is an enlarged side elevational view of a portion of the presser rollers of the present invention.

Referring to FIG. 2, an enlarged side elevational view of a portion of the presser rollers of the present invention is shown. As shown, the concave-pattern presser roller 2 has a circumferential surface on which at least one concave-pattern pressing spot 21 is formed. The convex-pattern presser roller 3 has a circumferential surface on which at least one convex-pattern pressing spot 31 is formed. The concave-pattern pressing spot 21 of the concave-pattern presser roller 2 and the convex-pattern pressing spot 31 of the convex-pattern presser roller 3 are arranged to correspond to each other, whereby the concave-pattern presser roller 2 and the convex-pattern presser roller 3 generate a rolling pressure P therebetween that acts on the first thin paper layer 1*a* and the second thin paper layer 1*b* to have them pressed and bonded together, and also to form patterns on then. The patterns can be all kinds of lines, figures, and texts. The patterns comprise tiny raised/recessed dots generated by being pressed by recessed spots and raised spots of the concave-pattern presser roller 2 and the convex-pattern presser roller 3.

Figure 3:
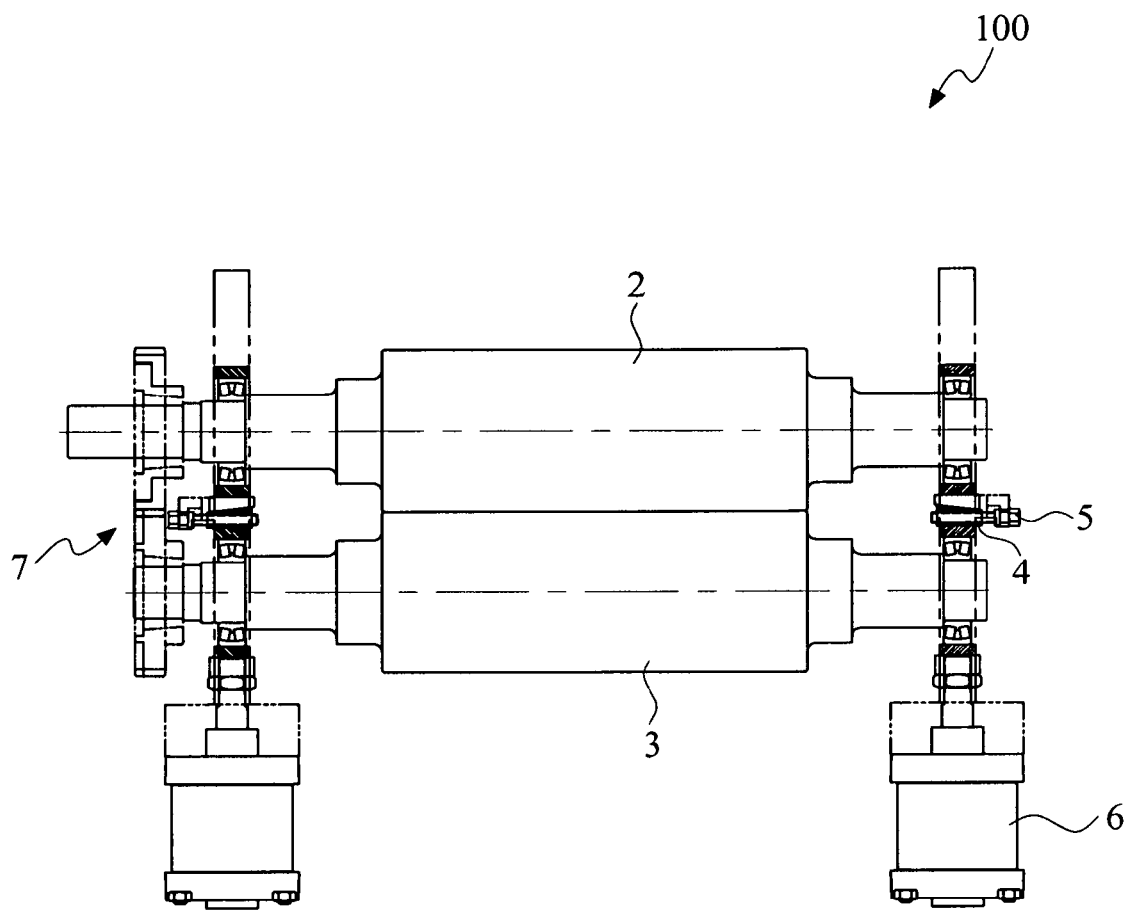
FIG. 3 is a top view of a presser roller mechanism in accordance with the present invention.

Referring to FIG. 3, a top view of a presser roller mechanism in accordance with the present invention is shown. As shown, the presser roller mechanism, generally designated at 100, comprises a concave-pattern presser roller 2, a convex-pattern presser roller 3, a wedge block 4, an adjusting bolt 5, an extension controller 6, and a precision gear train 7. The wedge block 4, through rotation of the adjusting bolt 5, adjusts a rolling gap between the concave-pattern presser roller 2 and the convex-pattern presser roller 3 to a desired size in order to have the thin paper layers firmly bonded together after rolling and to ensure formation of clear patterns through the rolling operation.

Once the rolling gap between the concave-pattern presser roller 2 and the convex-pattern presser roller 3 has been properly adjusted and set, the extension controller 6 applies a force to firmly support bearing seats of the convex-pattern presser roller 3, so that a sufficient pressure can be induced between the concave-pattern presser roller 2 and the convex-pattern presser roller 3 when they rotate. The concave-pattern presser roller 2 comprises a motor (not shown) to serve as a power source. The concave-pattern presser roller 2, when in rotation, drives the precision gear train 7 to rotate convex-pattern presser roller 3 in order to ensure that each convex-pattern pressing spot 31 of the convex-pattern presser roller 3 (see FIG. 2) is properly set in alignment with a corresponding concave-pattern pressing spot 21 of the concave-pattern presser roller 2, whereby the circumferential surfaces of the convex-pattern presser roller 3 and the concave-pattern presser roller 2 are not subjected to potential risk of damage caused by pressing therebetween. Here, it is noted that the convex-pattern pressing spot 31 is a tiny raised spot and the concave-pattern pressing spot 21 is a tiny recessed spot. The distance or pitch between adjacent spots can be varied as desired. The presser roller mechanism 100 may be constructed in different ways to correspond to difference between different types of products.

Figure 4:
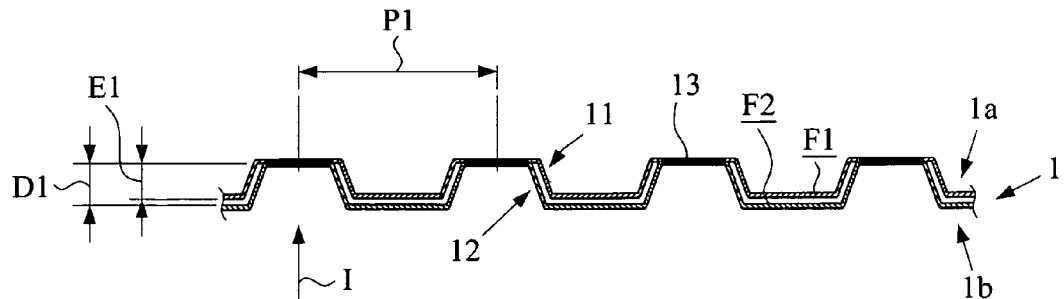
FIG. 4 shows a first embodiment of a thin paper sheet made in accordance with the present invention, illustrating a cross-sectional view of pressing spots within a press-to-bond zone of the thin paper sheet.
Figure 5:
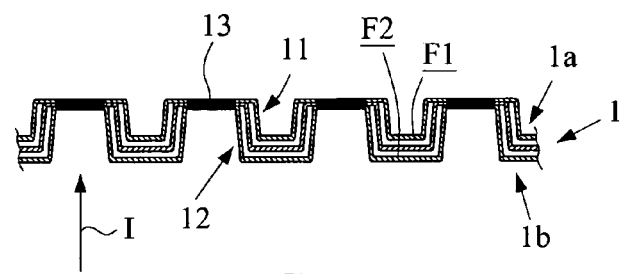
FIG. 5 shows a second embodiment of a thin paper sheet made in accordance with the present invention, illustrating a cross-sectional view of pressing spots within a press-to-bond zone of the thin paper sheet.
Figure 6:
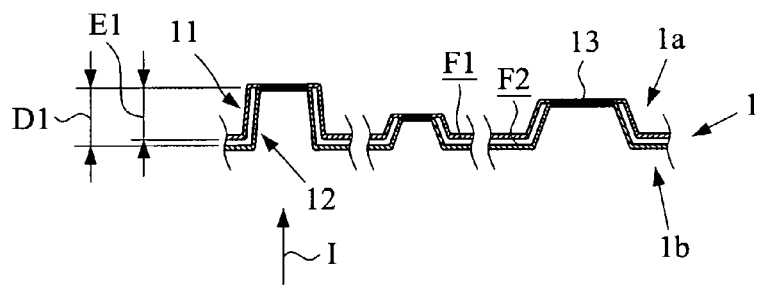
FIG. 6 shows a third embodiment of a thin paper sheet made in accordance with the present invention, illustrating a cross-sectional view of pressing spots within a press-to-bond zone of the thin paper sheet.
Figure 7:
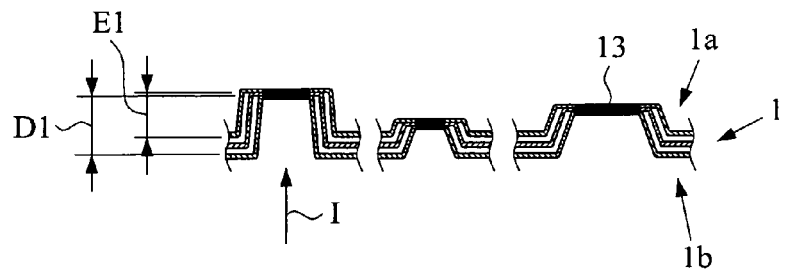
FIG. 7 shows a fourth embodiment of a thin paper sheet made in accordance with the present invention, illustrating a cross-sectional view of pressing spots within a press-to-bond zone of the thin paper sheet.

Referring to FIGS. 4-7, first to fourth embodiments of the multiply thin paper sheet having a press-to-bond structure in accordance with the present invention are given, showing cross-sectional views of various pressing spots within a press-to-bond zone of the thin paper sheet. As shown in FIG. 4, the two-ply or multiply thin paper sheet 1 having the press-to-bond structure in accordance with the present invention comprises a first thin paper layer 1*a* and at least one second thin paper layer 1*b*, wherein the first thin paper layer 1*a* has a first stacking surface F1 and the second thin paper layer 1*b* has a second stacking surface F2, the second stacking surface F2 being arranged to partially overlap the first stacking surface F1 to define a stacking zone S provided between the first thin paper layer 1*a* and the second thin paper layer 1*b* (see FIG. 2).

When the first thin paper layer 1*a* and the second thin paper layer 1*b* pass through the presser roller mechanism 100, the stacking zone S is acted upon by the rolling pressure P induced by the rolling operation of the concave-pattern presser roller 2 and the convex-pattern presser roller 3 and consequently, a plurality of first pressed sections 11 are formed on the first thin paper layer 1*a*, having a predetermined height extended according to a direction I, and a plurality of second pressed sections 12 are formed on the second thin paper layer 1*b* according to the given direction I and respectively corresponding to the first pressed sections 11. At least one portion of each first pressed section 11, as well as the corresponding second pressed section 12, are bonded together by the rolling pressure P to form a pressed and bonded site 13 that is used to bond the first thin paper layer 1*a* and the second thin paper layer 1*b* together accordingly and provides a press-to-bond zone A corresponding to each first pressed section 11 and associated second pressed section 12. The present invention allows addition of counts of paper plies in order to meet different needs of use desired by users (also see FIG. 5).

The predetermined height of the second pressed section 12 of the second thin paper layer 1*b* formed by being pressed by a convex-pattern pressing spot 31 of the convex-pattern presser roller 3 is a raised height D1 and the first pressed section 11 has a recessed height E1 that corresponds to the raised height D1 of the second pressed section 12. The convex-pattern pressing spots 31 of the convex-pattern presser roller 3 (or the concave-pattern pressing spots 21 of the concave-pattern presser roller 2) have a pitch P1. The raised height D1, the recessed height E1, the pitch P1, and shape of the configuration of the pressing spots can be adjusted or modified as desired to cope with the nature of the thin paper sheet 1 or any practical needs (see both FIGS. 6 and 7). The recessed height E1 needs to be controlled within a predetermined range, such as 0.05-2.0 mm, in order to prevent damage occurring on the multiply thin paper sheet 1 during the rolling process.

Figure 8:
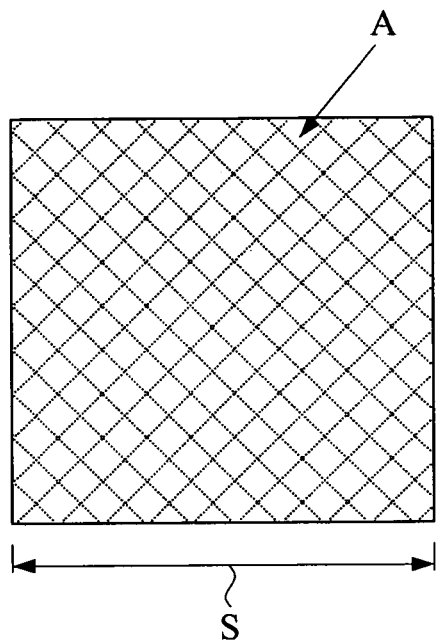
FIG. 8 is a schematic view of an example of a pattern formed on the thin paper sheet by rolling.
Figure 9:
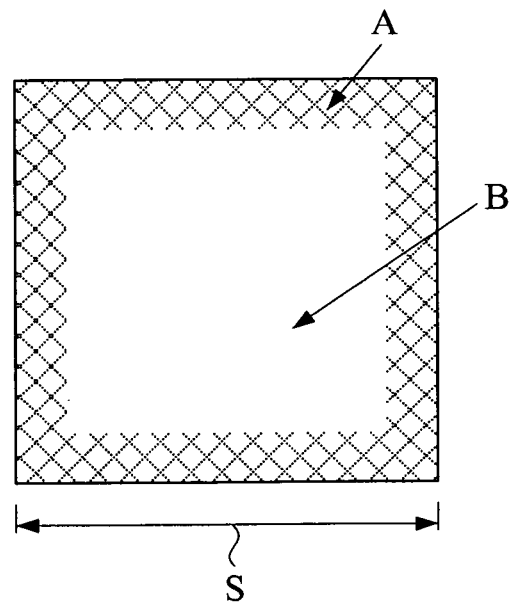
FIG. 9 is a schematic view of another example of a pattern formed on the thin paper sheet by rolling.

Referring to FIGS. 8-11, various types of pattern formed on the thin paper sheet by rolling are demonstrated. The two-ply or multiply thin paper sheet 1, after being rolled, shows a stacking zone S that contains a press-to-bond zone A. The press-to-bond zone A is defined by the first pressed section 11 of the first thin paper layer 1*a* and the second pressed section 12 of the second thin paper layer 1*b* that are bonded together as being subjected to pressing, functioning to bond together the two layers or multiple layers of the thin paper sheet with the rolling operation, so that all the layers of the paper sheet are fixed together. The press-to-bond zone A may occupy the whole surface area of a thin paper sheet product, such as various hygiene paper products, including paper handkerchiefs, facial tissues, kitchen towels, withdrawable tissue papers, or rolled tissue papers, as shown in FIG. 8. In a preferred embodiment, desired designs of patterns are provided on the presser rollers so that, besides the press-to-bond zone A, the stacking zone S also forms a patterned zone B (see FIGS. 9-11), which functions to provide a three-dimensional configuration, such as FIG. 8, characters or texts 9, or various lines 10, having a uniform altitude or different altitudes on the two-ply or multiply thin paper sheet after the two-ply or multiply thin paper sheet has been subjected to rolling by the presser rollers. Or alternatively, no pattern is formed in the patterned zone B (as shown in FIG. 9), making it a flat surface area of the paper sheet. Thus, the press-to-bond zone A can be, as shown in the drawings, applied to a circumferential marginal area of a hygiene paper product, such as paper handkerchiefs, facial tissues, kitchen towels, withdrawable tissue papers or rolled tissue papers.

Figure 10:
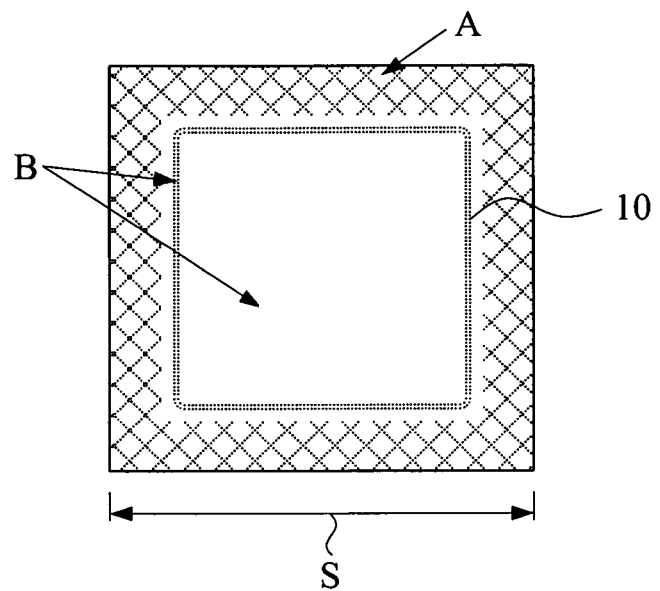
FIG. 10 is a schematic view of another example of a pattern formed on the thin paper sheet by rolling.
Figure 11:
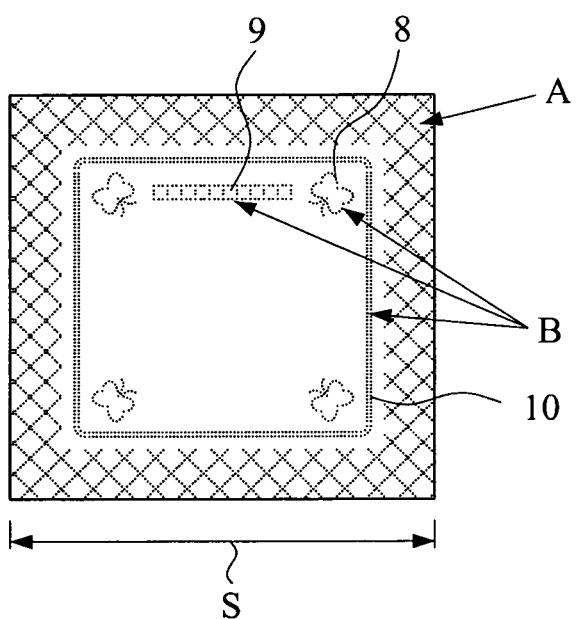
FIG. 11 is a schematic view of another example of a pattern formed on the thin paper sheet by rolling.

The patterned zone B can alternatively be made of a flat surface area or contain only lines 10, as shown in FIG. 10, or comprise various FIG. 8, characters or texts 9, and lines 10, as shown in FIG. 11. The counts and pitches of the FIG. 8, characters or texts 9, and lines 10 can be varied as desired. To summarize, the press-to-bond zone A and the patterned zone B have the functions of bonding after being pressed, forming patterns, and generating a three-dimensional configuration of various FIG. 8, characters or texts 9, or lines 10 having a uniform altitude or different altitudes.

Figure 12:
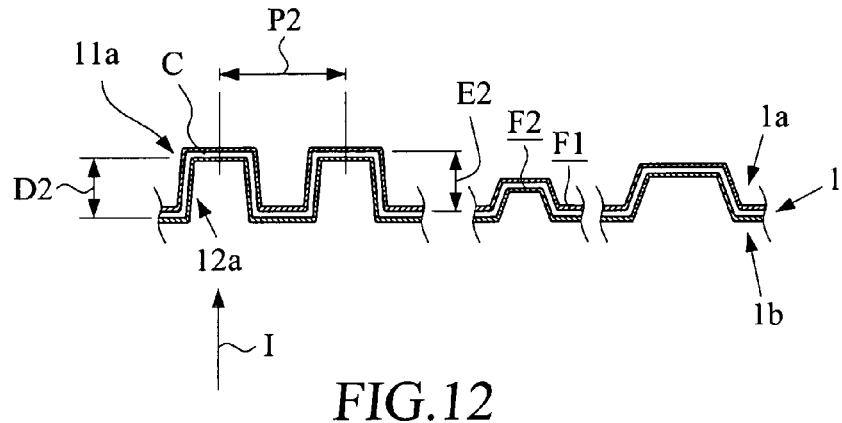
FIG. 12 shows a fifth embodiment of a thin paper sheet made in accordance with the present invention, illustrating a cross-sectional view of pressing spots within a patterned zone of the thin paper sheet.
Figure 13:
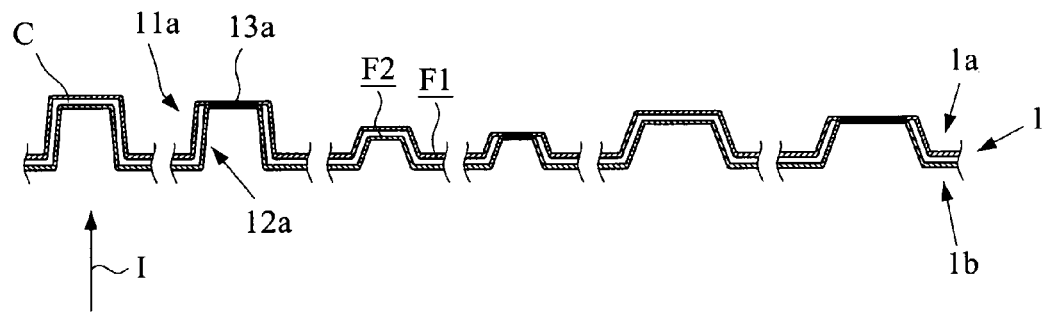
FIG. 13 shows a sixth embodiment of a thin paper sheet made in accordance with the present invention, illustrating a cross-sectional view of pressing spots within a patterned zone of the thin paper sheet.
Figure 14:
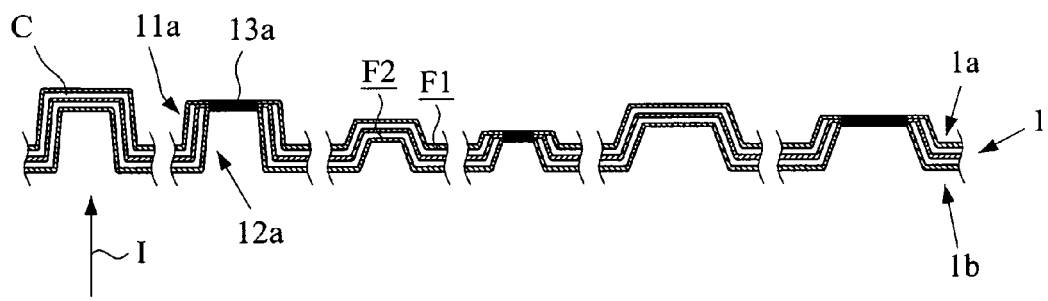
FIG. 14 shows a seventh embodiment of a thin paper sheet made in accordance with the present invention, illustrating a cross-sectional view of pressing spots within a patterned zone of the thin paper sheet.

Referring to FIGS. 12-14, fifth to seventh embodiments of the thin paper sheet in accordance with the present invention are given, showing cross-sectional views of various pressing spots of the thin paper sheet within the patterned zone. The first thin paper layer 1*a* further comprises at least one third pressed section 11*a* having a predetermined height and the second thin paper layer 1*b* further comprises a fourth pressed section 12*a* corresponding to the third pressed section 11*a*. The fourth pressed section 12*a* that is formed on the second thin paper layer 1*b* by being pressed by a convex-pattern pressing spot 31 of the convex-pattern presser roller 3 has a predetermined height that is a raised height D2. The third pressed section 11*a* has a recessed height E2 that corresponds to the raised height D2 of the fourth pressed section 12*a*. The convex-pattern pressing spots 31 of the convex-pattern presser roller 3 (or the concave-pattern pressing spots 21 of the concave-pattern presser roller 2) have a pitch P2. The raised height D2, the recessed height E2, the pitch P2, and shape of the configuration of the pressing spots can be adjusted or modified as desired to cope with the nature of the thin paper sheet 1 or any practical needs in order to form, in the patterned zone B, a three-dimensional configuration of FIG. 8, characters or texts 9, or lines 10 having a uniform altitude or different altitudes. The recessed height E2 needs to be controlled within a predetermined range, such as 0.05-2.0 mm.

The third pressed sections 11*a* and the fourth pressed sections 12*a* of the two-ply or multiply thin paper sheet 1 formed in the patterned zone B can be not bonded together as desired and provide a gap C therebetween. Or alternatively, the third pressed section 11*a* and the fourth pressed section 12*a* can be pressed to bond together to form a pressed and bonded site 13*a* in order to have the third pressed section 11*a* and the fourth pressed section 12*a* fixed together.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A multi-ply thin paper sheet comprising:
   a first thin paper layer, having a first stacking surface; and
   at least one second thin paper layer, having a second stacking surface, the second stacking surface partially overlapping the first stacking surface to define a stacking zone provided between the first thin paper layer and the second thin paper layer;
   wherein after the stacking zone is subjected to a rolling operation by a rolling pressure, a plurality of first pressed sections having a faceted cross-section formed on the first thin paper layer to be recessed from the first stacking surface thereof by a predetermined recessed depth extended according to a given direction, and a plurality of second pressed sections having a faceted cross-section formed on the second thin paper layer to protrude from the second stacking surface thereof by a predetermined raised height according to the given direction, the first pressed sections and stacking surfaces respectively corresponding to and being nested within the second pressed sections and stacking surfaces,
   wherein at least one faceted portion of each first pressed section and the corresponding second pressed section are bonded together by the rolling pressure to form a pressed and bonded site formed between each of said first and corresponding second pressed sections to non-adhesively bond the first thin paper layer and the second thin paper layer one to the other, the first and second stacking surfaces remaining nested in unattached manner one with respect to the other, wherein said predetermined recess depth of at least one of said plurality of first pressed sections differs from said predetermined recess depth of at least another first pressed section, and wherein said predetermined raised height of at least one of said plurality of second pressed sections differs from the predetermined raised height of at least another second pressed section.

2. A multi-ply thin paper sheet comprising:

a first thin paper layer, having a first stacking surface; and at least one second thin paper layer, having a second stacking surface, the second stacking surface partially overlapping the first stacking surface to define a stacking zone provided between the first thin paper layer and the second thin paper layer, the stacking zone comprising a press-to-bond zone and a patterned zone;

wherein after the stacking zone is subjected to a rolling operation by a rolling pressure, a plurality of first pressed sections having a faceted cross-section are formed on the first thin paper layer to be recessed from the first stacking surface thereof by a predetermined recessed depth extended according to a given direction, and a plurality of second pressed sections having a faceted cross-section are formed on the second thin paper layer to protrude from the second stacking surface thereof according to the given direction, the first pressed sections and stacking surfaces respectively corresponding to and being nested within the second pressed sections and stacking surfaces, wherein at least one faceted portion of each first pressed section and the corresponding second pressed section are bonded together by the rolling pressure to form a pressed and bonded site formed between each of said first and the corresponding pressed sections to nonadhesively bond the first thin paper layer and the second thin paper layer one to the other, the first and second stacking surfaces remaining nested in unattached manner one with respect to the other, and wherein the press-to-bond zone is provided on the first pressed sections and the corresponding second pressed sections and the patterned zone is formed within an area of the stacking zone other than where the press-to-bond zone is defined, wherein said predetermined recess recess depth of at least one of said plurality of first pressed sections differs from the predetermined recess depth of at least another first pressed section, and wherein said predetermined raised height of at least one of said plurality of second pressed sections differs from predetermined raised heights of at least another second pressed section.

3. The multi-ply thin paper sheet as claimed in claim 2, wherein the first thin paper layer further comprises at least one third pressed section having a predetermined height in the patterned zone, and wherein the second thin paper layer further comprises at least one fourth pressed section being corresponding to the third pressed section.

4. The multi-ply thin paper sheet as claimed in claim 3, wherein all of the predetermined heights of the third pressed sections of the first thin paper layer within the patterned zone is identical.

5. The multi-ply thin paper sheet as claimed in claim 3, wherein one of the predetermined heights of the third pressed sections of the first thin paper layer within the patterned zone is different from another.

6. The multi-ply thin paper sheet as claimed in claim 3, wherein the third pressed sections and the fourth pressed sections of the patterned zone are collectively formed as a predetermined figure.

7. The multi-ply thin paper sheet as claimed in claim 3, wherein the third pressed sections and the fourth pressed sections of the patterned zone are collectively formed as a predetermined text.

8. The multi-ply thin paper sheet as claimed in claim 3, wherein the third pressed sections and the fourth pressed sections of the patterned zone are collectively formed as a predetermined line.

9. The multi-ply thin paper sheet as claimed in claim 3, wherein the third pressed sections and the fourth pressed sections of the patterned zone are separated from each other for having a gap therebetween.

10. The multi-ply thin paper sheet as claimed in claim 3, wherein the third pressed sections and the fourth pressed sections of the patterned zone are bonded to each other according to the selected sites.

* * * * *